US012793271B2

(12) United States Patent
Nabeto et al.

(10) Patent No.: US 12,793,271 B2
(45) Date of Patent: Nov. 10, 2026

(54) PROCESSING APPARATUS, PROCESSING METHOD AND NON-TRANSITORY STORAGE MEDIUM FOR MANAGING A DISPLAY TIME OF A PRODUCT

(71) Applicant: NEC Corporation, Tokyo (JP)

(72) Inventors: Yu Nabeto, Tokyo (JP); Soma Shiraishi, Tokyo (JP); Takami Sato, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 293 days.

(21) Appl. No.: 17/927,957

(22) PCT Filed: May 29, 2020

(86) PCT No.: PCT/JP2020/021316
§ 371 (c)(1),
(2) Date: Nov. 28, 2022

(87) PCT Pub. No.: WO2021/240772
PCT Pub. Date: Dec. 2, 2021

(65) Prior Publication Data
US 2023/0206507 A1 Jun. 29, 2023

(51) Int. Cl.
*G06K 9/00* (2022.01)
*G06Q 10/087* (2023.01)
(Continued)

(52) U.S. Cl.
CPC ............. *G06T 7/97* (2017.01); *G06Q 10/087* (2013.01); *G06T 7/70* (2017.01); *G06V 10/70* (2022.01);
(Continued)

(58) Field of Classification Search
CPC ........ G06V 10/10; G06V 10/20; G06V 10/22; G06V 10/25; G06V 10/40; G06V 10/70;
(Continued)

(56) References Cited

U.S. PATENT DOCUMENTS 6,298,331 B1 * 10/2001 Walker ................. G06Q 10/087 705/16
10,157,308 B2 * 12/2018 Ebrom ................... G06V 20/52
(Continued)

FOREIGN PATENT DOCUMENTS

JP 2010-121784 A 6/2010
JP 2016-057022 A 4/2016
(Continued)

OTHER PUBLICATIONS

JP Office Action for JP Application No. 2023-220563, mailed on Oct. 29, 2024 with English Translation.
(Continued)

*Primary Examiner* — Eric Rush
(74) *Attorney, Agent, or Firm* — Sughrue Mion, PLLC

(57) ABSTRACT

The present invention provides a processing apparatus (10) including: an acquisition unit (11) that acquires a plurality of time-series images including a display area; a product detection unit (12) that detects a product from each of a plurality of the time-series images; an identity determination unit (13) that determines identity of products detected from the images that are different from each other; a display time management unit (14) that manages a display time of each detected product, based on a result of the detection and a result of the identity determination; and an output unit (15) that outputs information related to the display time of each detected product.

10 Claims, 7 Drawing Sheets

(51) Int. Cl.

| | |
|---|---|
| ***G06T 7/00*** | (2017.01) |
| ***G06T 7/70*** | (2017.01) |
| ***G06V 10/70*** | (2022.01) |
| ***G06V 20/52*** | (2022.01) |
| ***G06V 20/68*** | (2022.01) |

(52) U.S. Cl.
CPC .............. *G06V 20/52* (2022.01); *G06V 20/68* (2022.01); *G06T 2207/30128* (2013.01)

(58) Field of Classification Search
CPC .... G06V 10/74; G06V 10/764; G06V 10/768; G06V 10/82; G06V 20/20; G06V 20/40; G06V 20/41; G06V 20/44; G06V 20/50; G06V 20/52; G06V 20/60; G06V 20/64; G06V 20/68; G06V 20/70; G06T 7/00; G06T 7/10; G06T 7/11; G06T 7/174; G06T 7/20; G06T 7/254; G06T 7/70; G06T 7/97; G06T 2207/10016; G06T 2207/30128; G06T 2207/30232; G06Q 10/08; G06Q 10/087; G06Q 10/30; G06Q 20/203; G06Q 20/208; G06Q 30/06; G06Q 30/0601; G06Q 30/0623; G06Q 30/0631; G06Q 30/0633; Y02P 90/30; B65G 1/137
USPC ........ 382/100, 103, 110, 141–143, 153, 155, 382/156, 159, 165, 173, 181, 190, 209, 382/217, 224–229, 282, 291, 312, 325; 705/14.1, 14.13, 14.23, 14.24, 22, 23, 705/26.1, 26.61, 26.63, 26.7, 26.8, 28, 705/303, 308; 235/377, 378, 383, 385
See application file for complete search history.

(56) References Cited

U.S. PATENT DOCUMENTS

| | | | | |
|---|---|---|---|---|
| 11,448,632 | B2 * | 9/2022 | Velez | G06Q 10/04 |
| 2010/0283573 | A1 * | 11/2010 | Yum | G05B 15/02 340/3.1 |
| 2014/0320647 | A1 * | 10/2014 | Seo | F25D 29/00 348/143 |
| 2017/0219279 | A1 * | 8/2017 | Chae | G01K 1/024 |
| 2017/0262973 | A1 * | 9/2017 | Johnston | G06T 7/13 |
| 2017/0345162 | A1 * | 11/2017 | Bamba | G06V 20/41 |
| 2018/0196401 | A1 * | 7/2018 | Lagares-Greenblatt | G05B 19/042 |
| 2019/0130180 | A1 * | 5/2019 | Shiraishi | G06T 7/20 |
| 2019/0215424 | A1 * | 7/2019 | Adato | G06V 10/17 |
| 2020/0013169 | A1 | 1/2020 | Higa | |
| 2020/0097776 | A1 * | 3/2020 | Kim | G06T 7/70 |
| 2020/0211285 | A1 * | 7/2020 | Abdoo | G06V 20/20 |

FOREIGN PATENT DOCUMENTS

| | | | |
|---|---|---|---|
| JP | 2016-058105 | A | 4/2016 |
| JP | 2016-196981 | A | 11/2016 |
| JP | 2018-151819 | A | 9/2018 |
| JP | 2019-114000 | A | 7/2019 |
| WO | 2018/179361 | A1 | 10/2018 |
| WO | 2019/107157 | A | 6/2019 |

OTHER PUBLICATIONS

English translation of Written Opinion of the International Searching Authority in PCT patent application to which present application claims priority, PCT/JP2020/021316, dated Sep. 15, 2020.
International Search Report for PCT Application No. PCT/JP2020/021316, mailed on Sep. 15, 2020.

* cited by examiner

FIG. 3

DISPLAY TIME MANAGEMENT INFORMATION

| SERIAL NUMBER | PRODUCT IDENTIFICATION INFORMATION | PRODUCT POSITION INFORMATION | DISPLAY START TIME | .... |
|---|---|---|---|---|
| 001 | 0013289 | (x1,y1),(x2,y2)<br>(x3,y3),(x4,y4) | 9:18:01 | .... |
| 002 | 0013289 | (x5,y5),(x6,y6)<br>(x7,y7),(x8,y8) | 9:18:32 | .... |
| .... | .... | .... | .... | |

FIG. 6

FRAME DISPLAY REFERENCE

| DISPLAY TIME | FRAME COLOR |
|---|---|
| LESS THAN M1 | BLUE |
| EQUAL TO OR MORE THAN M1 AND LESS THAN M2 | YELLOW |
| EQUAL TO OR MORE THAN M2 | RED |

PROCESSING APPARATUS, PROCESSING METHOD AND NON-TRANSITORY STORAGE MEDIUM FOR MANAGING A DISPLAY TIME OF A PRODUCT

This application is a National Stage Entry of PCT/JP2020/021316 filed on May 29, 2020, the contents of all of which are incorporated herein by reference, in their entirety.

TECHNICAL FIELD

The present invention relates to a processing apparatus, a processing method, and a program.

BACKGROUND ART

Patent Document 1 discloses a technique for recognizing a food material in each group of time-series images capturing an inside of a refrigerator, determining, based on a result of the recognition, whether the food material is moved, determining the food material of which a not-moved period is exceeds a threshold value as a left-over item, and issuing a warning.

RELATED DOCUMENT

Patent Document

[Patent Document 1] Japanese Patent Application Publication No. 2016-57022

DISCLOSURE OF THE INVENTION

Technical Problem

There is a store in which a sell-by date for a product is set for a purpose of preventing an accident and the like. In such a store, it is necessary for a store clerk to have a means for recognizing a product of which a sell-by date is passed, a product of which a sell-by date is close, and the like. For example, when a label on which various kinds of information such as a freshness date, an expiry date, and the like are printed is attached to each product, a means of checking a label on each product on display can be used. However, it may not be possible to attach a label to a product such as a side dish that is not individually packaged, such as a croquette, a yakitori, and the like, and a fresh food. Also, work to check a label on each product on display is very time-consuming. Patent Document 1 does not disclose such problems in a store and a solution thereof.

An object of the present invention is to provide a technique for recognizing a status of a sell-by date of each product on display.

Solution to Problem

According to the present invention, a processing apparatus including:

- an acquisition unit that acquires a plurality of time-series images including a display area;
- a product detection unit that detects a product from each of a plurality of the time-series images;
- an identity determination unit that determines identity of products detected from the images that are different from each other;
- a display time management unit that manages a display time of each detected product, based on a result of the detection and a result of the identity determination; and
- an output unit that outputs information related to the display time of each detected product is provided.

Further, according to the present invention, a processing method including, by a computer:

- acquiring a plurality of time-series images including a display area;
- detecting a product from each of a plurality of the time-series images;
- determining identity of products detected from the images that are different from each other;
- managing a display time of each detected product, based on a result of the detection and a result of the identity determination; and
- outputting information related to the display time of each detected product is provided.

Further, according to the present invention, a program causing a computer to function as:

- an acquisition unit that acquires a plurality of time-series images including a display area;
- a product detection unit that detects a product from each of a plurality of the time-series images;
- an identity determination unit that determines identity of products detected from the images that are different from each other;
- a display time management unit that manages a display time of each detected product, based on a result of the detection and a result of the identity determination; and
- an output unit that outputs information related to the display time of each detected product is provided.

Advantageous Effects of Invention

According to the present invention, a technique for recognizing a status of a sell-by date of each product on display is achieved.

BRIEF DESCRIPTION OF THE DRAWINGS

FIG. 3 is a diagram illustrating one example of information to be processed by the processing apparatus according to the present example embodiment.

FIG. 6 is a diagram illustrating one example of information to be processed by the processing apparatus according to the present example embodiment.

DESCRIPTION OF EMBODIMENTS

"Premise"

In a store where a processing apparatus according to the present example embodiment is used, sell-by dates for at least some products are determined based on a display time of the products (time for which the product is on display). Specifically, the sell by date is a timing when the display time exceeds an upper limit value.

The at least some products of which sell-by dates are managed based on the display time may be a product to which a label cannot be attached, for example, such as a croquette, and a yakitori, or may be a product to which a label can be attached. Further, the product is, for example, food, but is not limited thereto, and may be another kind of product such as a household electric appliance and an article of stationary.

A product of which a sell-by date is passed or a product of which a sell-by date is close is recalled from a display shelf, or is sold at a discounted price.

Outline

When detecting a product from each of a plurality of time-series images including a display area of the product, the processing apparatus according to the present example embodiment determined identity of products detected from the images that are different from each other, and manages, based on a result of the detection and a result of identity determination, a display time of each product displayed in the display area. Further, the processing apparatus outputs information related to the display time of each product on display.

A store clerk can recognize, based on the information output from the processing apparatus, a status of a sell-by date of each product on display, specifically, "whether the sell-by date is passed", "whether the sell-by date is close", and the like.

Hardware Configuration

Next, one example of a hardware configuration of the processing apparatus is described. Each functional unit of the processing apparatus is achieved by any combination of hardware and software, mainly including a central processing unit (CPU) of any computer, a memory, a program loaded into the memory, a storage unit (capable of storing a program that has been stored in advance from a stage of shipping an apparatus, as well as a program downloaded from a storage medium such as a compact disc (CD), a server on the Internet, or the like) such as a hard disk storing the program, and an interface for network connection. Further, it is understood by a person skilled in the art that there are various modification examples of a method and an apparatus for achieving the functional unit.

Figure 1:
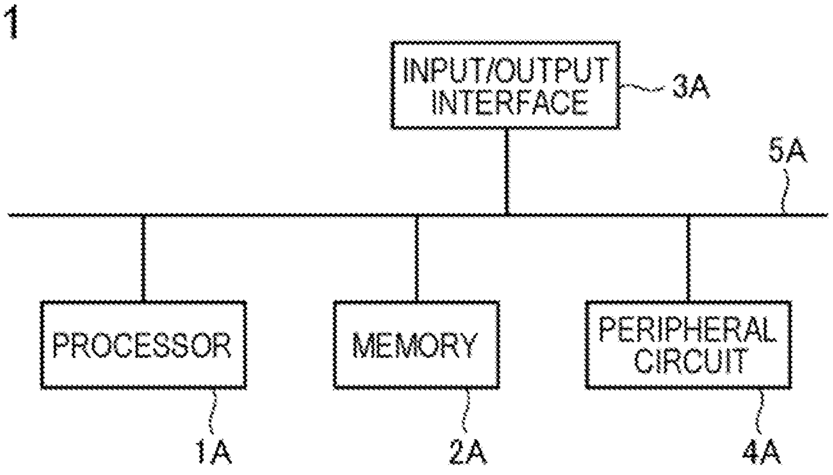
FIG. 1 is a diagram illustrating one example of a hardware configuration of a processing apparatus according to the present example embodiment.

FIG. 1 is a block diagram illustrating a hardware configuration of the processing apparatus. As illustrated in FIG. 1, the processing apparatus includes a processor 1A, a memory 2A, an input/output interface 3A, a peripheral circuit 4A, and a bus 5A. The peripheral circuit 4A includes various modules. The processing apparatus may not include the peripheral circuit 4A. Note that, the processing apparatus may be configured by a plurality of apparatuses that are physically and/or logically separated, or may be configured by a single apparatus that is physically and/or logically integrated. When the processing apparatus is configured by a plurality of apparatuses that are physically and/or logically separated, each of the plurality of apparatuses can have above-described hardware configuration.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU, and a graphics processing unit (GPU). The memory 2A is, for example, a memory such as a random access memory (RAM), and read only memory (ROM). The input/output interface 3A includes an interface for acquiring information from an input apparatus, an external apparatus, an external server, an external sensor, a camera, and the like, and an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A is capable of issuing an instruction to each module, and performing an arithmetic operation, based on a result of arithmetic operation by each module.

Functional Configuration

Figure 2:
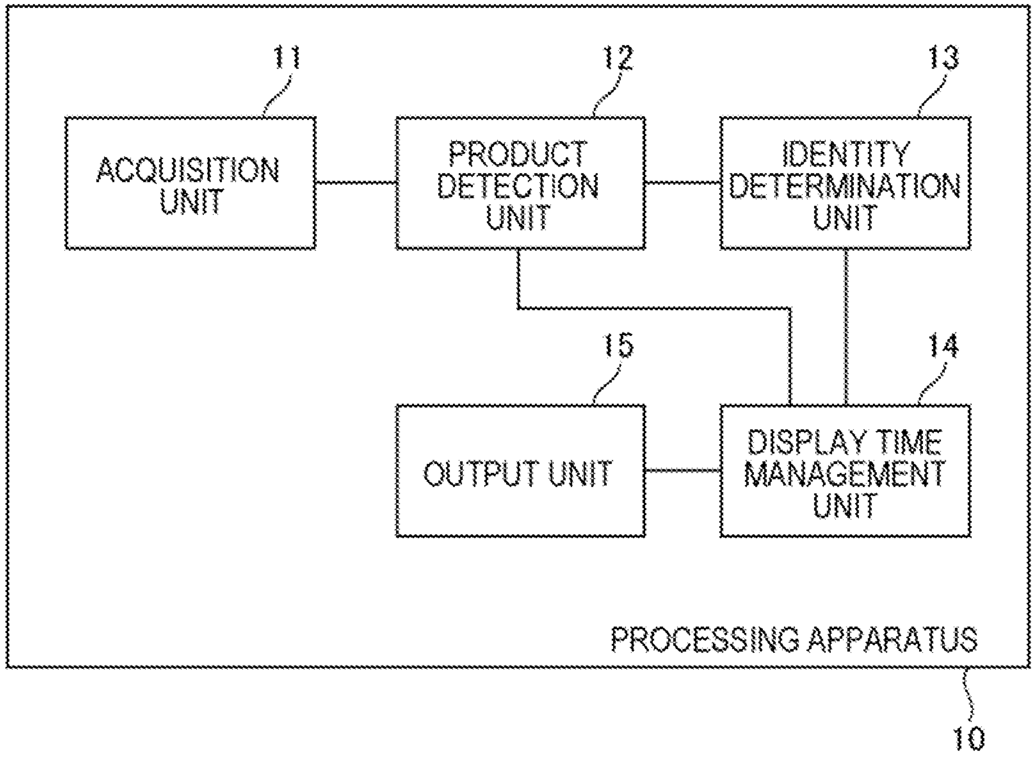
FIG. 2 is one example of functional block diagram of the processing apparatus according to the present example embodiment.

FIG. 2 illustrates one example of a functional block diagram of the processing apparatus 10. As illustrated, the processing apparatus 10 includes an acquisition unit 11, a product detection unit 12, an identity determination unit 13, a display time management unit 14, and an output unit 15.

The acquisition unit 11 acquires a plurality of time-series images including a display area. The display area is an area where a product is displayed, and is achieved by, for example, a product display shelf and the like. In a store in which the processing apparatus 10 is used, a camera is installed in a position and an orientation from which a product displayed in the display area (preferably, all products displayed in the display area) is captured.

The camera may continuously (for example, during business hours) capture a moving image, or may regularly capture a still image at a time interval greater than a frame interval of the moving image. The acquisition unit 11 acquires an image generated by such a camera.

The product detection unit 12 detects a product from each of a plurality of time-series images. Further, the product detection unit 12 outputs, as a detection result, position information (hereinafter, "product position information") indicating a position in the image and product identification information (a product code, a product name, and the like) for each of the detected products.

The product detection can be achieved by using any well-known product recognition technique. For example, the product detection unit 12 detects an object area (an area where an object is present) by using a well-known object detection technique. The product detection unit 12 may detect, as the object area, an area (for example, a rectangular area) including an object and surroundings of the object. Otherwise, the product detection unit 12 may detect, as the object area, an area shaped along an outline of an object and where only the object is present. The latter can be achieved, for example, by using a method of detecting a pixel area where a detection target is present, which is called a semantic segmentation or an instance segmentation.

Further, the product detection unit 12 recognizes, by using a well-known product recognition technique (keypoint matching, deep learning, or the like), a product included in an image of the object area.

The product position information is indicated by, for example, coordinates of a two-dimensional coordinate system set on an image. The product position information may be indicated by one point in the image, or may be indicated by an area occupying a part of the image. For example, the product position information may be information indicating a representative point (a center, a barycenter, or the like) of the above-described object area, or may be information indicating the above-described object area (a partial area in the image).

The identity determination unit 13 determines identity of products detected from images different from each other. Specifically, the identity determination unit 13 determines whether a product detected from a first image is identical to a product detected from a second image. Herein, identical means that the products are the same individual. Specifically, when the products are separate individuals, the products are not identical as defined herein, even when pieces of the product identification information match with each other. In the following, an example of processing of determining identity is described.

Determination Example 1

The identity determination unit 13 is capable of determining identity of products detected from each of images different from each other, based on positions, in the image, of the products. When the positions in the image of the products each detected from each of a plurality of the images are the same or a difference between the positions is within a threshold value, the products each detected from each of the plurality of images can be determined to be an identical product. In case of the example, two images whose difference in image generation timing (capture timing) is equal to or less than a reference time become targets of identity determination processing (the above-described first image and second image). The reference time is a design matter, but becomes a value being small to some extent.

When the product position information is indicated by one point in an image, the identity determination unit 13 may use that "a distance between points is equal to or less than a threshold value", as a condition for determining that the products are identical. Further, when the product position information is occupied by a partial area in the image, the identity determination unit 13 may use that "areas that overlap each other occupy equal to or more than a reference percentage of an area indicated by each piece of product position information", as the condition for determining that the products are identical. The condition for determining that the products are identical exemplified herein is merely one example, and is not limited there to.

Note that, the identity determination unit 13 may use that "the above-described condition is satisfied and pieces of the product identification information match with each other", as a condition for determining that the products are identical.

Determination Example 2

The identity determination unit 13 is capable of determining identity of products detected from each of images that are different from each other, based on feature values (shapes, sizes, colors, and the like) of appearances of the products. Even when the products are of the same kind (pieces of the product identification information match with each other), an individual difference may appear in appearance of the products. The identity determination unit 13 is capable of determining identity of the products, based on such an individual difference in appearance.

The display time management unit 14 manages, based on a result of detection by the product detection unit 12 and a result of identity determination by the identity determination unit 13, a display time of each product detected by the product detection unit 12.

For example, the display time management unit 14 is capable of starting management of a display time of a product, among products detected from an image, that is not determined to be identical to any one of products detected from an image being previous in time-series to the image, as a product newly displayed in a display area. Further, the display time management unit 14 is capable of ending management of a display time of a product, among products detected from an image, that is not determined to be identical to any one of products detected from an image being subsequent to the image.

Herein, a specific example of processing performed by the display time management unit 14 is described with reference to FIGS. 3 and 4. First, the display time management unit 14 manages display time management information as illustrated in FIG. 3. The display time management information illustrated associates a serial number, product identification information, product position information, and a display start time with one another. The serial number is information for distinguish products managed in the display time management information from each other. The product identification information is product identification 0 information of a product managed in the display time management information. The product position information is a piece of latest product position information of each of the products managed in the display time management information. The display start time is a time at which display of each of the products managed in the display time management information is started. Note that, a display start date and time, a display start date, or the like may be used instead of the display start time.

Figure 4:
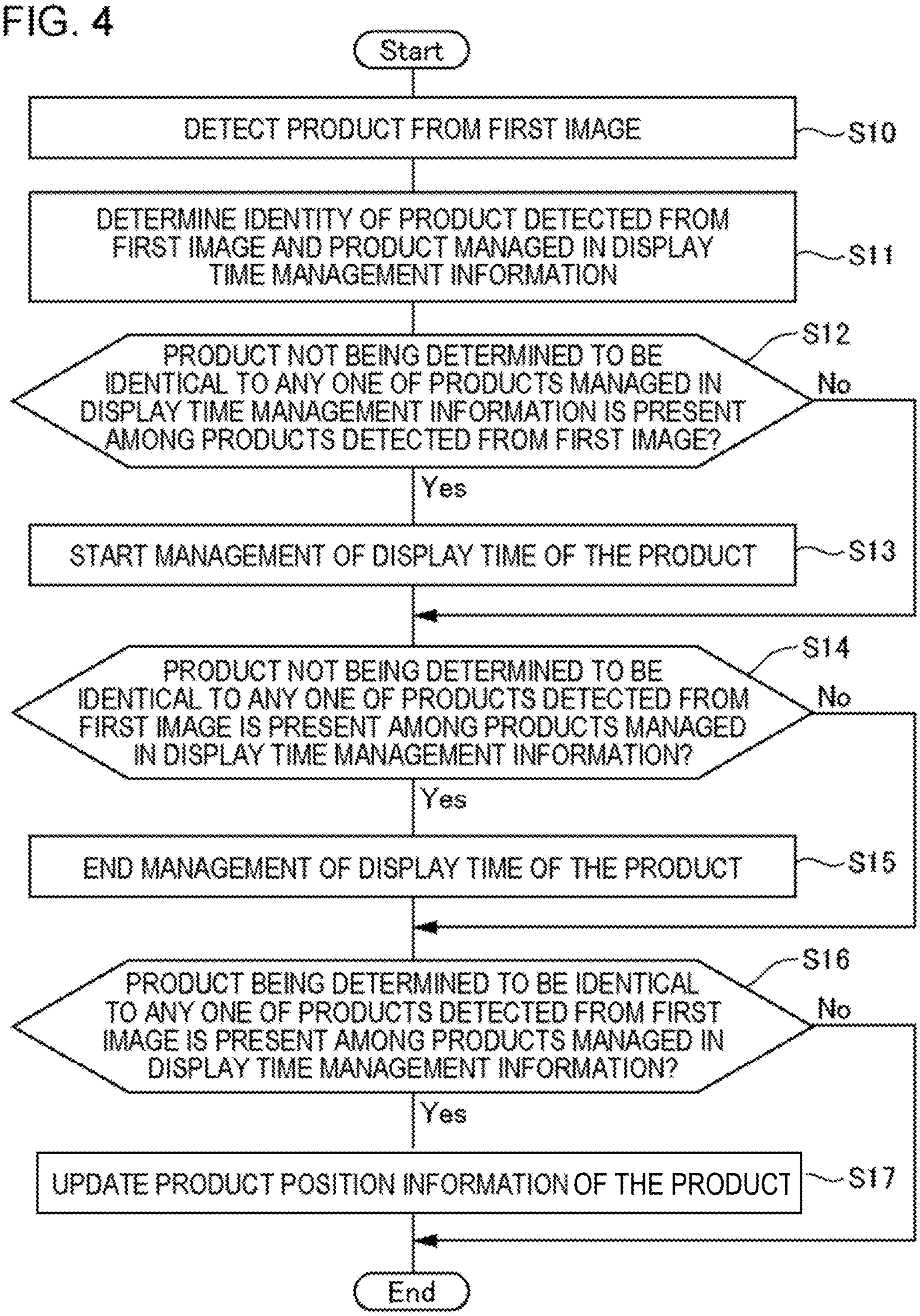
FIG. 4 is a flowchart illustrating one example of a flow of processing of the processing apparatus according to the present example embodiment.

As illustrated in FIG. 4, when the product detection unit 12 detects a product from a first image (S10), the identity determination unit 13 determines, based on the product position information of each detected product and the product position information of each product managed in the display time management information as illustrated in FIG. 3, identity of each of the products detected from the first image and a product managed in the display time management information (S11).

Further, when a product not being determined to be identical to any one of the products managed in the display time management information is present among the products detected from the first image (Yes in S12), the display time management unit 14 starts management of a display time of the product (S13). Specifically, the display time management unit 14 registers product identification information and product position information of the product in association with a new serial number, and also registers, as a display start time, a generation timing (capture timing) of the first image or a timing near the generation timing of the first image.

Note that, when there is no product managed in the display time management information at a timing of determination in S11, the display time management unit 14 determines that a product not being determined to be identical to any one of the products managed in the display time management information is present among the products detected from the first image (Yes in S12), and starts management of a display time of all the products detected from the first image (S13).

On the other hand, when a product not being determined to be identical to any one of the products managed in the display time management information is not present in the products detected from the first image (No in S12), the display time management unit 14 does not execute processing in S13.

Further, when a product not being determined to be identical to any one of the products detected from the first image is present among the products managed in the display time management information (Yes in S14), the display time management unit 14 ends management of a display time of the product (S15). For example, the display time management unit 14 may delete information of the product from the display time management information. Otherwise, the display time management unit 14 may register, in association with the product, information indicating that management of the display time is ended.

Note that, the above-described "information indicating that management of a display time is ended" may be time information or date and time information indicating the generation timing (capture timing) of the first image or a timing near the generation timing of the first image. By registering such information, a display start time and a display end time of each of a plurality of products can be recorded. Further, the information can be used in marketing and the like.

On the other hand, when a product not being determined to be identical to any one of the products detected from the first image is not present among the products managed in the display time management information (No in S14), the display time management unit 14 does not execute processing in S15.

Further, when a product being determined to be identical to any one of the products detected from the first image is present among the products managed in the display time management information (Yes in S16), the display time management unit 14 updates product position information of the product managed in the display time management information to product position information of the product detected from the first image (S17).

On the other hand, when a product being determined to be identical to any one of the products detected from the first image is not present among the products managed in the display time management information (No in S16), the display time management unit 14 does not execute processing in S17.

Note that, order of determination in S12, S14 and S16 is not limited to the illustrated example.

Returning to FIG. 2, the output unit 15 outputs information related to a display time of each product detected by the product detection unit 12. For example, the output unit 15 outputs a processed image displaying, on an image acquired by the acquisition unit 11, in association with each product detected from the image, information related to a display time of each product. The output unit 15 may achieve output of the above-described information via an output apparatus such as a display, a projection apparatus, a printer, and a mailer that are connected to the processing apparatus 10, or may transmit the above-described information to another external apparatus. In the following, an example of the information related to a display time is described.

Example 1 of Information Related to Display Time

The "information related to a display time" to be output may be "information indicating an approximation of a display time". For example, the display time is divided into a plurality of groups such as "less than Ml", "equal to or more than M1 and less than M2", and "equal to or more than M2". Note that, the number of the groups is any number equal to or more than two. Further, the "information indicating an approximation of a display time" becomes information indicating which group a current display time of each product belongs to.

Figure 5:
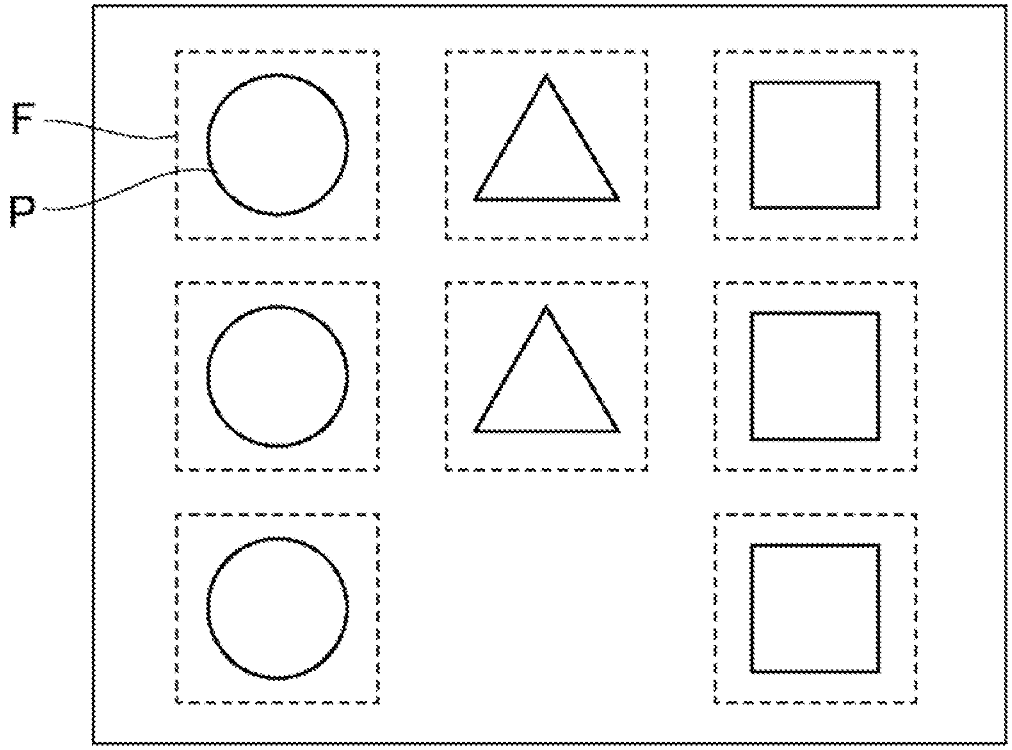
FIG. 5 is a diagram illustrating one example of an image output from the processing apparatus according to the present example embodiment.

FIG. 5 illustrates one example of a processed image displaying the information. In the illustrated example, a frame F is displayed in association with each product P detected by the product detection unit 12. A display position of the frame F is decided based on, for example, a piece of product position information of each product P. A display style (a line color, a line shade, a line type, and the like) of the frame F of each product P changes according to which group the display time of each product P belongs to. The display style of the frame F according to the display time is predetermined as illustrated in FIG. 6, and the frame F of each product P is displayed in a style according to the predetermined display style.

Note that, a frame display reference as illustrated in FIG. 6 may be different for each product P. Specifically, values of M1 and M2 in the frame display reference may be different for each product P. Further, although the frame display reference is divided into three groups in the example illustrated in FIG. 6, the number of groups may also be different for each product P.

Further, the output unit 15 may highlight a product P of which the display time exceeds an upper limit value. There are various methods of highlighting, and for example, a frame F of the product P may be caused to blink, or may be displayed in a predetermined color (red). The upper limit value may be different for each product P.

Example 2 of Information Related to Display Time

The "information related to a display time" to be output may be "information indicating an approximation of a remaining time until a sell-by date". The remaining time until a sell-by date (hereinafter, which may simply be referred to as a "remaining time") is computed by subtracting the display time from the above-described upper limit value. For example, the remaining time is divided into a plurality of groups such as "less than L1", "equal to or more than L1 and less than L2", and "equal to or more than L2". Note that, the number of the groups is any number equal to or more than two. Further, the "information indicating an approximation of a remaining time" becomes information indicating which group the remaining time of each product belongs to.

FIG. 5 illustrates one example of a processed image displaying the information. In the illustrated example, a frame F is displayed in association with each product P detected by the product detection unit 12. A display position of the frame F is decided based on, for example, a piece of product position information of each product P. A display style (a line color, a line shade, a line type, and the like) of the frame F of each product P changes according to which group the remaining time of each product P belongs to. The display style of the frame F according to the remaining time is predetermined, and the frame F of each product P is displayed in a style according to the predetermined display style.

Note that, a frame display reference may be different for each product P. Further, the number of the above-described groups may also be different for each product P. Further-more, the output unit 15 may highlight a product P of which the remaining time is below a lower limit value. There are various methods of highlighting, and for example, a frame F of the product P may be caused to blink, or may be displayed in a predetermined color (red).

Example 3 of Information Related to Display Time

Figure 7:
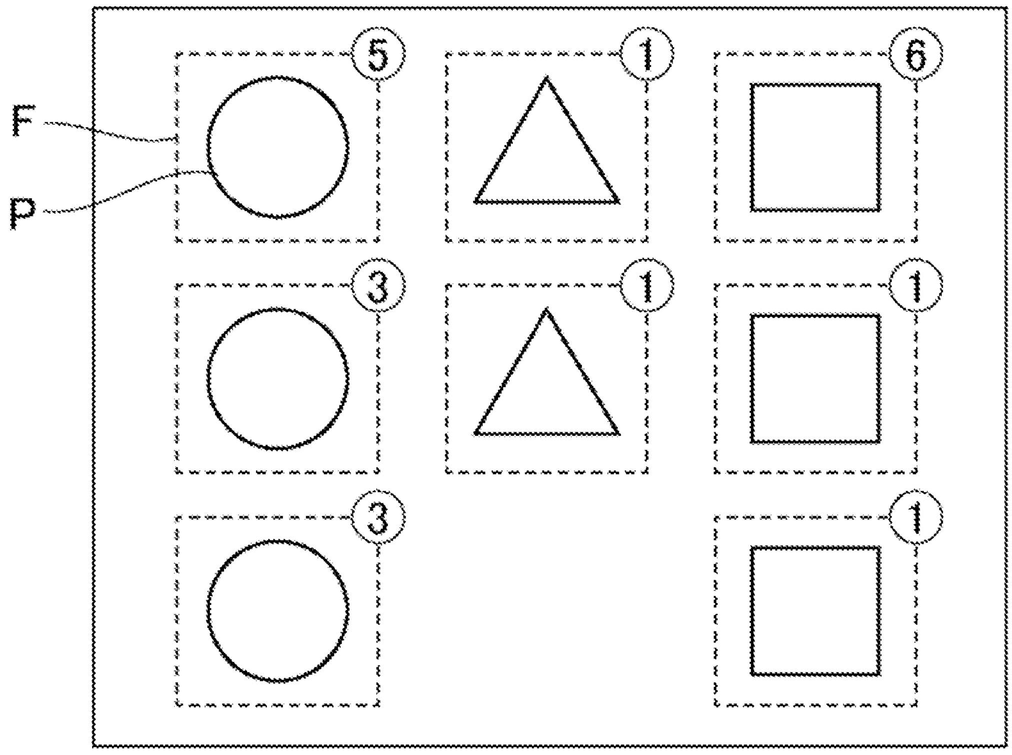
FIG. 7 is a diagram illustrating one example of an image to be output from the processing apparatus according to the present example embodiment.

The "information related to a display time" to be output may be a "display time" or a "remaining time until a sell-by date" itself. FIG. 7 illustrates one example of a processed image displaying the information. A number displayed in association with a frame F indicates a "display time" or a "remaining time until a sell-by date". The "display time" and the "remaining time until a sell-by date" are indicated in any unit such as "month", "day", "hour", "minute", "second", and the like. For example, it is indicated that the display time or the remaining time of a product associated with "1" is "one month", "one day", "one hour", "one minute", or "one second".

Note that, in the above-described examples 1 to 3, the frame F may be substituted with another mark.

Example 4 of Information Related to Display Time

In the present example, the display time management unit 14 manages a display time of each product in a plurality of display areas, for each of the display areas. Further, the output unit 15 outputs, as information related to a display time, display area identification information in which a product of which a display time exceeds a report reference value is present. The display area identification information is information for identifying each of the plurality of display areas from each other. The report reference value may be different for each product.

Advantageous Effect

As described above, according to the processing apparatus 10 of the present example embodiment, a display time of a product displayed in a display area can be managed based on a plurality of time-series images including the display area. Further, the processing apparatus 10 is capable of outputting information related to a display time of each product on display. A store clerk can recognize, based on the information output from the processing apparatus 10, a status of a sell-by date of each product on display, specifically, "whether the sell-by date is passed", "whether the sell-by date is close", and the like.

Further, as illustrated in FIGS. 5 and 7, the processing apparatus 10 is capable of outputting a processed image displaying, on an image including a display area, in association with each product detected from the image, information indicating a display time. According to such a processed image, a store clerk can intuitively recognize a sales status of each product on display.

Note that, in the present description, "acquisition" includes at least one of: "retrieving data stored in another apparatus or a storage medium by an own apparatus (active acquisition)" based on a user input or based on a program instruction, for example, receiving data by making a request or query to another apparatus, reading data by accessing another apparatus or a storage medium, and the like; "inputting data output from another apparatus to an own apparatus (passive acquisition)", based on a user input or based on a program instruction, for example, receiving data that are distributed (or transmitted, notified by a push notification, or the like), and selecting and acquiring data or information from received data or information; and "generating new data by editing data (converting the data into a text, reordering pieces of the data, extracting some pieces of the data, changing a file format, and the like) and acquiring the new data".

While the invention of the present application has been described with reference to the example embodiment (and the examples), the invention of the present application is not limited to the above-described example embodiment (and the examples). Various modifications that can be understood by a person skilled in the art may be made in configuration and details of the invention of the present application within the scope of the invention of the present application.

A part or the entirety of the above-described example embodiment may be described as the following supplementary notes, bet is not limited thereto.

1. A processing apparatus including:

an acquisition unit that acquires a plurality of time-series images including a display area;

a product detection unit that detects a product from each of a plurality of the time-series images;

an identity determination unit that determines identity of products detected from the images that are different from each other;

a display time management unit that manages a display time of each detected product, based on a result of the detection and a result of the identity determination; and an output unit that outputs information related to the display time of each detected product.

2. The processing apparatus according to supplementary note 1, wherein the output unit outputs, on the image, a processed image displaying, in association with each product detected from the image, information indicating the display time.

3. The processing apparatus according to supplementary note 2, wherein the output unit outputs the processed image displaying, in association with each product detected from the image, information according to a length of the display time.

4. The processing apparatus according to supplementary note 2, wherein the output unit outputs the processed image highlighting a product of which the display time exceeds an upper limit value.

5. The processing apparatus according to supplementary note 4, wherein the upper limit value is different for each product.

6. The processing apparatus according to any one of supplementary notes 1 to 5, wherein the identity determination unit determines identity of products detected from the images that are different from each other, based on positions of the products in the image.

7. The processing apparatus according to any one of supplementary notes 1 to 6, wherein the display time management unit starts management of the display time of a product, among products detected from the image, that is not determined to be identical to any one of products detected from the image being previous to the image, as a product newly displayed in the display area.

8. The processing apparatus according to any one of supplementary notes 1 to 7, wherein the display time management unit ends management of the display time of a product, among products detected from the image, that is not determined to be identical to any one of products detected from the image being subsequent to the image.

9. A processing method including,
by a computer:
acquiring a plurality of time-series images including a display area;
detecting a product from each of a plurality of the time-series images;
determining identity of products detected from the images that are different from each other;
managing a display time of each detected product, based on a result of the detection and a result of the identity determination; and
outputting information related to the display time of each detected product.

10. A program causing a computer to function as:
an acquisition unit that acquires a plurality of time-series images including a display area;
a product detection unit that detects a product from each of a plurality of the time-series images;
an identity determination unit that determines identity of products detected from the images that are different from each other;
a display time management unit that manages a display time of each detected product, based on a result of the detection and a result of the identity determination; and
an output unit that outputs information related to the display time of each detected product.

What is claimed is:

1. A processing method performed by a computer and comprising:
acquiring a plurality of time-series images including a display area;
detecting a product from each image of the plurality of time-series images using a product recognition technique;
outputting product identification information of the detected product and position information of the detected product, the position information indicating a position of the detected product in each image of the plurality of time-series images;
determining, based on the product identification information and the position information, whether a newly detected product detected from a current image among the plurality of time-series images is identical to a previously detected product detected from a previous image among the plurality of time-series images and managed in display time management information ; determining
that the newly detected product and the previously detected product are identical in a case where a first condition and a second condition are satisfied, the first condition being that product identification information of the newly detected product and product identification information of the previously detected product are identical, the second condition being that a difference between a position of the newly detected product in the current image and a position of the previously detected product in the previous image is within a threshold value;
in a case where the newly detected product and the previously detected product are determined to be identical, updating position information of the previously detected product managed in the display time management information to position information of the newly detected product, and continuing to manage a display time length of the previously detected product;
in a case where the newly detected product is not determined to be identical to any of previously detected products managed in the display time management information, registering, in the display time management information, the newly detected product in association with position information of the newly detected product and a capture timing of the current image as a display start time, and starting a display time length of the newly detected product;
in a case where the previously detected product managed in the display time management information is not determined to be identical to any of newly detected products detected in the current image, ending management of the display time length of the previously detected product;
generating processed images by superimposing information on each image of the plurality of time-series images, the information indicating display time lengths of the previously detected products managed in the display time management information; and
outputting the processed images,
wherein the display time length of the newly detected product is a length of time since a timing when the newly detected product is first detected in the plurality of time-series images, and increases as time progresses,
wherein the processing method further comprises:
displaying, in at least one of the processed images, a frame in association with each of a plurality of products, including the product, detected from the plurality of time-series images; and
determining a display style of the frame to be displayed in association with each of the plurality of products based on a frame display reference indicating a correspondence between a length of display time and at least one of a line color of the frame, a line shade of the frame, and a line type of the frame,
wherein the frame display reference is defined for each product of the plurality of products and is different for each product of the plurality of products, and
wherein in the frame display reference:
a time length is divided into a plurality of groups,
the at least one of the line color, the line shade, and the line type of the frame is defined for each group of the plurality of groups, and the number of the plurality of groups is different for each product of the plurality of products.

2. A processing apparatus including:
at least one memory configured to store one or more instructions; and
at least one processor configured to execute the one or more instructions to:
acquire a plurality of time-series images including a display area;
detect a product from each image of the plurality of time-series images using a product recognition technique;
output product identification information of the detected product and position information of the detected product, the position information indicating a position of the detected product in each image of the plurality of time-series images;
determine, based on the product identification information and the position information, whether a newly detected product detected from a current image among the plurality of time-series images is identical to a previously detected product detected from a previous image among the plurality of time-series images and managed in display time management information;

determine that the newly detected product and the previously detected product are identical in a case where a first condition and a second condition are satisfied, the first condition being that product identification information of the newly detected product and product identification information of the previously detected product are identical, the second condition being that a difference between a position of the newly detected product in the current image and a position of the previously detected product in the previous image is within a threshold value;

in a case where the newly detected product and the previously detected product are determined to be identical, update position information of the previously detected product managed in the display time management information to position information of the newly detected product, and continue to manage a display time length of the previously detected product;

in a case where the newly detected product is not determined to be identical to any of previously detected products managed in the display time management information, register, in the display time management information, the newly detected product in association with position information of the newly detected product and a capture timing of the current image as a display start time, and start a display time length of the newly detected product;

in a case where the previously detected product managed in the display time management information is not determined to be identical to any of newly detected products detected in the current image, end management of the display time length of the previously detected product;

generate processed images by superimposing information on each image of the plurality of time-series images, the information indicating display time lengths of the previously detected products managed in the display time management information; and output the processed images, wherein the display time length of the newly detected product is a length of time since a timing when the newly detected product is first detected in the plurality of time-series images, and increases as time progresses;

wherein the at least one processor is configured to execute the one or more instructions to:

display, in at least one of the processed images, a frame in association with each of a plurality of products, including the product, detected from the plurality of time-series images; and determine a display style of the frame to be displayed in association with each of the plurality of products based on a frame display reference indicating a correspondence between a length of display time and at least one of a line color of the frame, and a line type of the frame, wherein the frame display reference is defined for each product of the plurality of products and is different for each product of the plurality of products, and wherein in the frame display reference:

a time length is divided into a plurality of groups, the at least one of the line color, the line shade, and the line type of the frame is defined for each group of the plurality of groups, and the number of the plurality of groups is different for each product of the plurality of products.

3. The processing apparatus according to claim 2, wherein the at least one processor outputs, on each image of the plurality of time-series images, a processed image displaying, in association with each product detected from the image, information indicating a display time.

4. The processing apparatus according to claim 3, wherein the at least one processor outputs on each image of the plurality of time-series images, the processed image displaying, in association with each product detected from the image, information according to a length of the display time.

5. The processing apparatus according to claim 3, wherein the at least one processor outputs, on each image of the plurality of time-series images, the processed image highlighting a product of which a display time exceeds an upper limit value.

6. The processing apparatus according to claim 5, wherein the upper limit value is different for each product.

7. The processing apparatus according to claim 2, wherein the at least one processor determines identities of products detected from the plurality of time-series images that are different from each other, based on positions of the products in each image of the plurality of time-series images.

8. The processing apparatus according to claim 2, wherein the at least one processor starts management of a display time length of a newly detected product, among products detected from each image of the plurality of time-series images, that is not determined to be identical to any one of products detected from a previous image of the plurality of time-series images, as a product newly displayed in the display area.

9. The processing apparatus according to claim 2, wherein the at least one processor ends management of a display time length of a newly detected product, among products detected from each image of the plurality of time-series images, that is not determined to be identical to any one of products detected from a subsequent image of the plurality of time-series images.

10. A non-transitory computer-readable medium storing a program executable by a computer to:

acquire a plurality of time-series images including a display area;

detect a product from each image of the plurality of time-series images using a product recognition technique;

output product identification information of the detected product and position information of the detected product, the position information indicating a position of the detected product in each image of the plurality of time-series images;

determine, based on the product identification information and the position information, whether a newly detected product detected from a current image among the plurality of time-series images is identical to a previously detected product detected from a previous image among the plurality of time-series images; and managed in display time management information;

determine that the newly detected product and the previously detected product are identical in a case where a first condition and a second condition are satisfied, the first condition being that product identification information of the newly detected product and product identification information of the previously detected product are identical, the second condition being that a difference between a position of the newly detected product in the current image and a position of the previously detected product in the previous image is within a threshold value;

in a case where the newly detected product and the previously detected product are determined to be identical, update position information of the previously detected product managed in the display time management information to position information of the newly detected product, and continue to manage a display time length of the previously detected product;

in a case where the newly detected product is not determined to be identical to any of previously detected products managed in the display time management information, register, in the display time management information, the newly detected product in association with position information of the newly detected product and a capture timing of the current image as a display start time, and start a display time length of the newly detected product;

in a case where the previously detected product managed in the display time management information is not determined to be identical to any of newly detected products detected in the current image, end management of the display time length of the previously detected product;

generate processed images by superimposing information on each image of the plurality of time-series images, the information indicating display time lengths of the previously detected products managed in the display time management information; and output the processed images, wherein the display time length of the newly detected product is a length of time since a timing when the newly detected product is first detected in the plurality of time-series images, and increases as time progresses wherein the program is further executable by the computer to:

display, in at least one of the processed images, a frame in association with each of a plurality of products, including the product, detected from the plurality of time-series images; and determine a display style of the frame to be displayed in association with each of the plurality of products based on a frame display reference indicating a correspondence between a length of display time and at least one of a line color of the frame, a line shade of the frame, and a line type of the frame, wherein the frame display reference is defined for each product of the plurality of products and is different for each product of the plurality of products, and wherein in the frame display reference:

a time length is divided into a plurality of groups, the at least one of the line color, the line shade, and the line type of the frame is defined for each group of the plurality of groups, and the number of the plurality of groups is different for each product of the plurality of products.

* * * * *